Jan. 9, 1951            R. W. BROWN            2,537,634

PIVOTAL MOUNTING FOR AIRCRAFT WHEELS

Filed Sept. 13, 1946            7 Sheets-Sheet 1

INVENTOR
ROY W. BROWN

BY *Ely & Frye*

ATTORNEYS

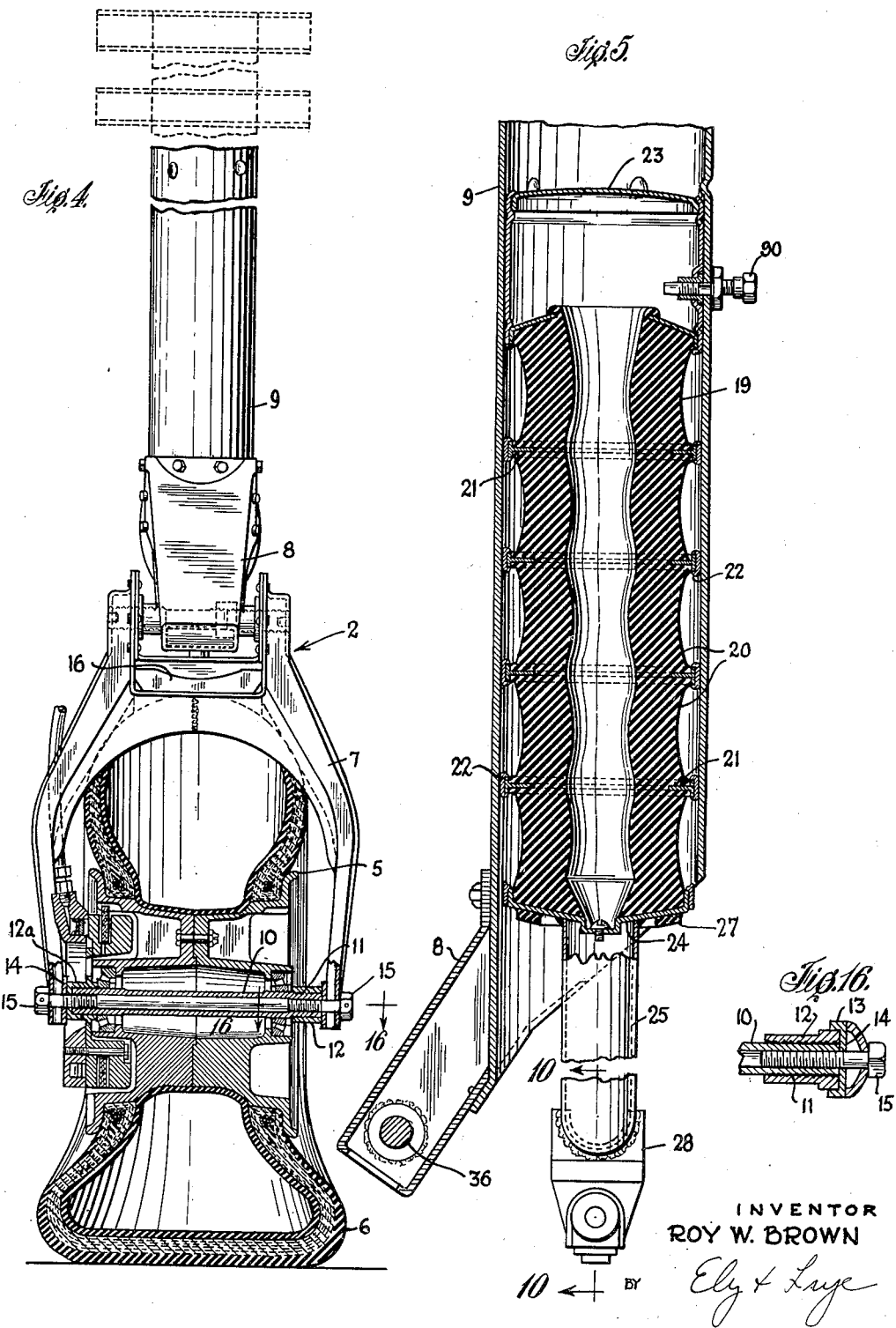

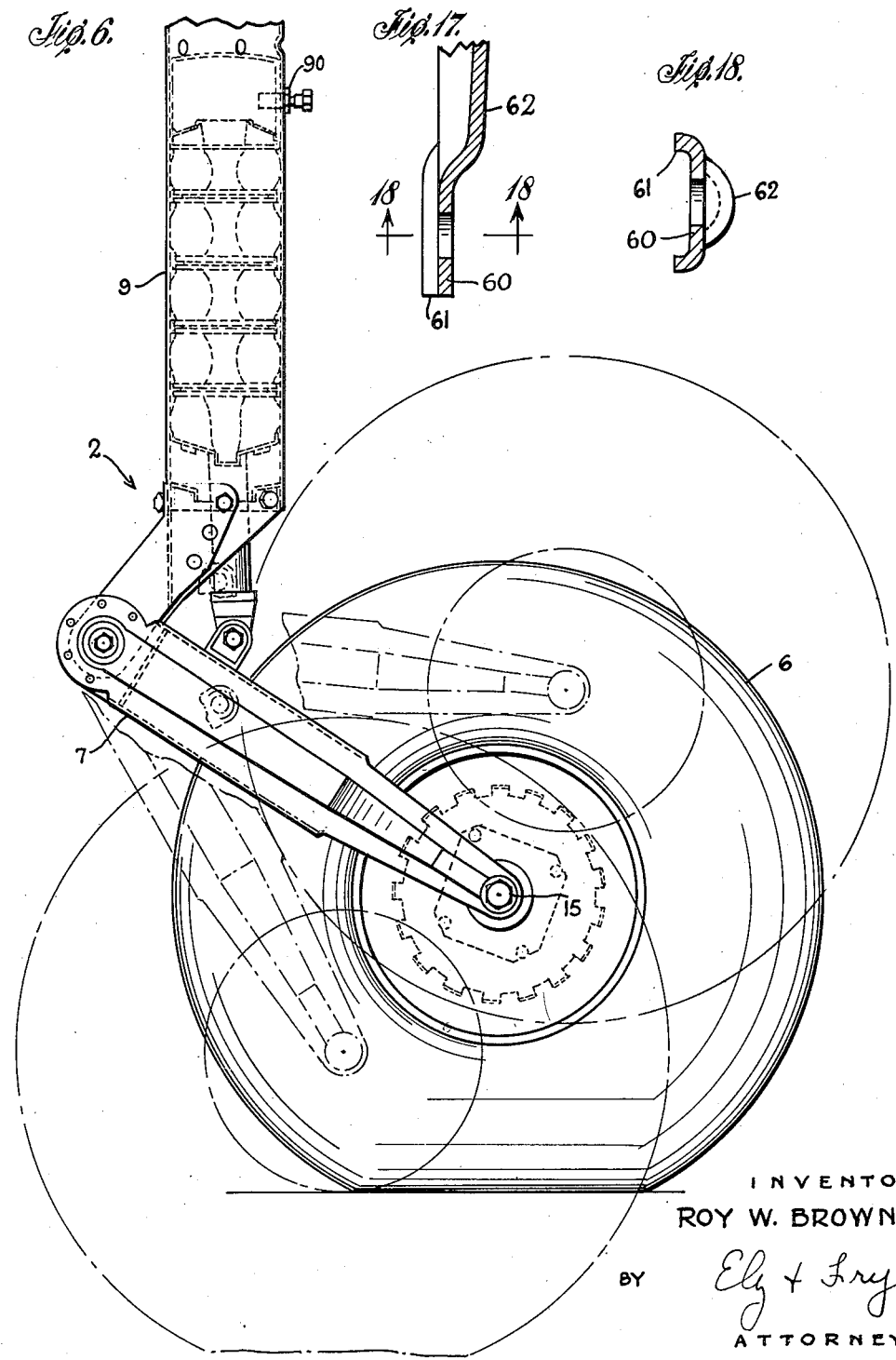

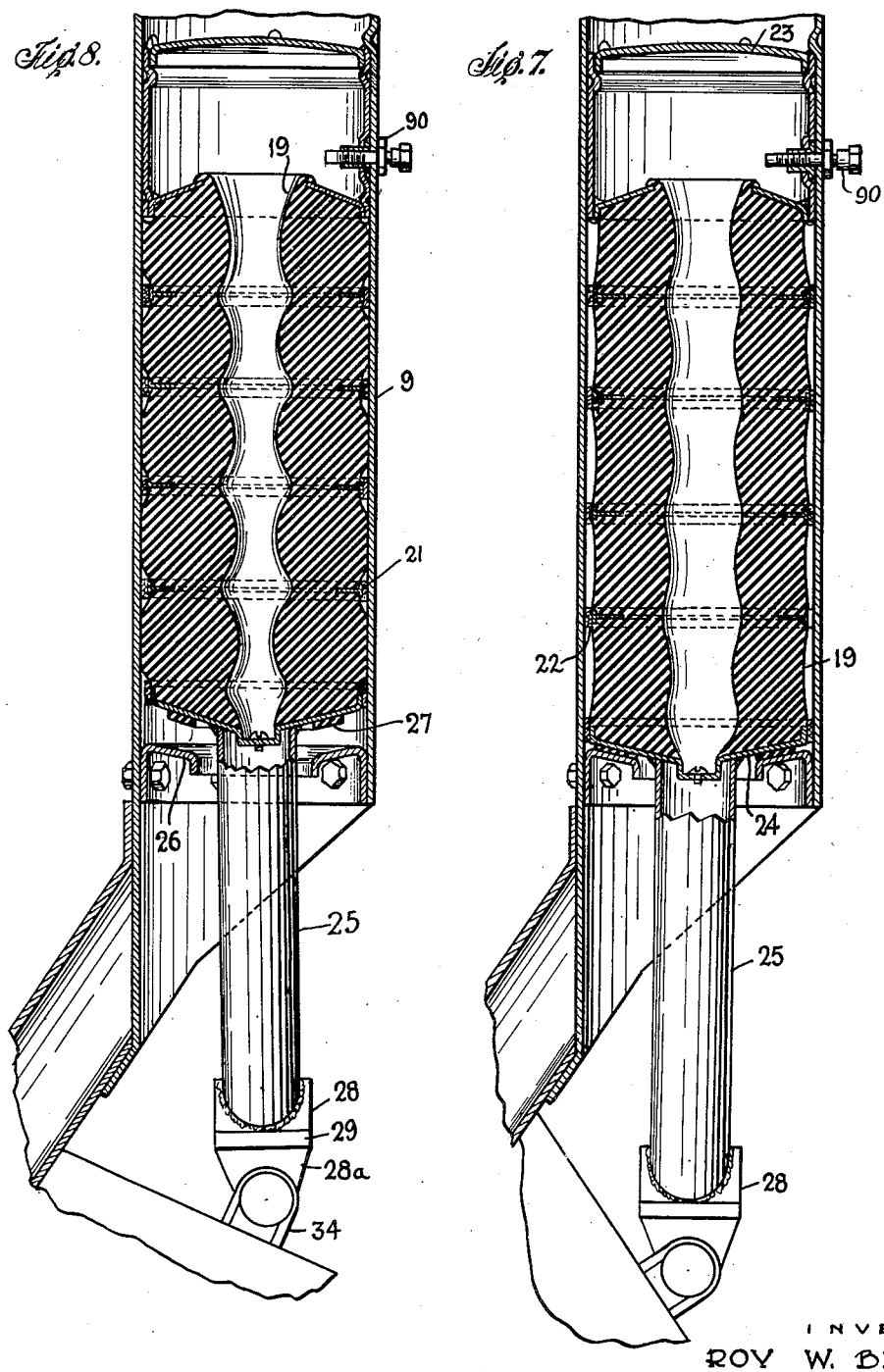

Jan. 9, 1951  R. W. BROWN  2,537,634
PIVOTAL MOUNTING FOR AIRCRAFT WHEELS
Filed Sept. 13, 1946  7 Sheets—Sheet 5
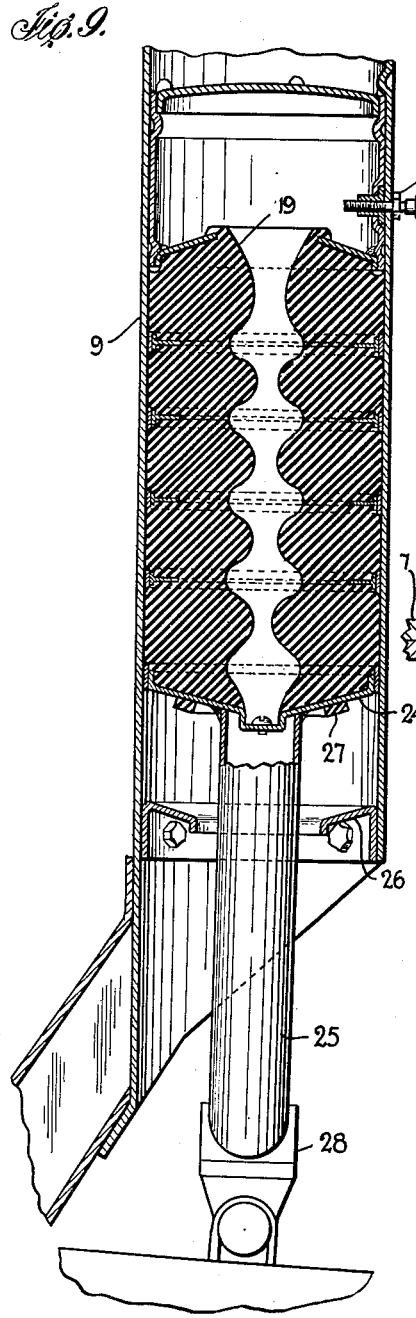
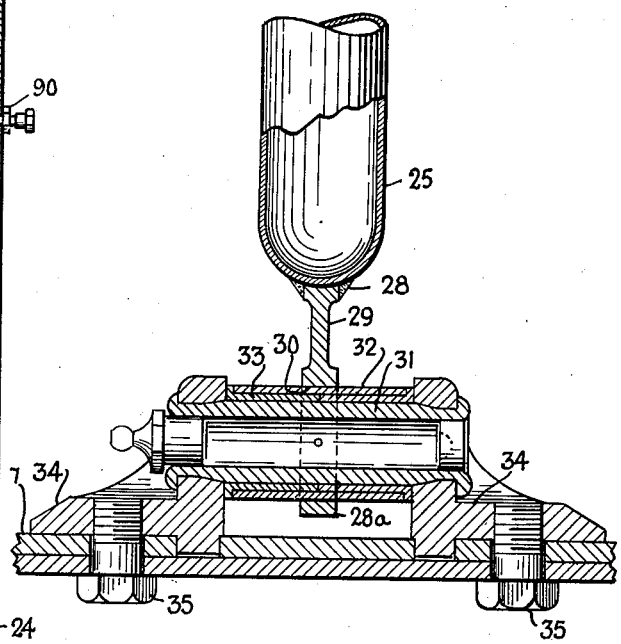
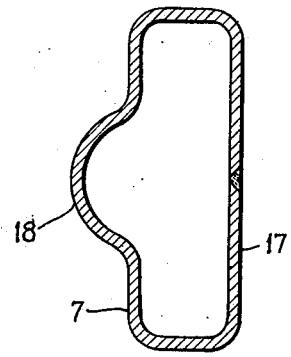
INVENTOR
ROY W. BROWN
BY Ely & Frye
ATTORNEYS

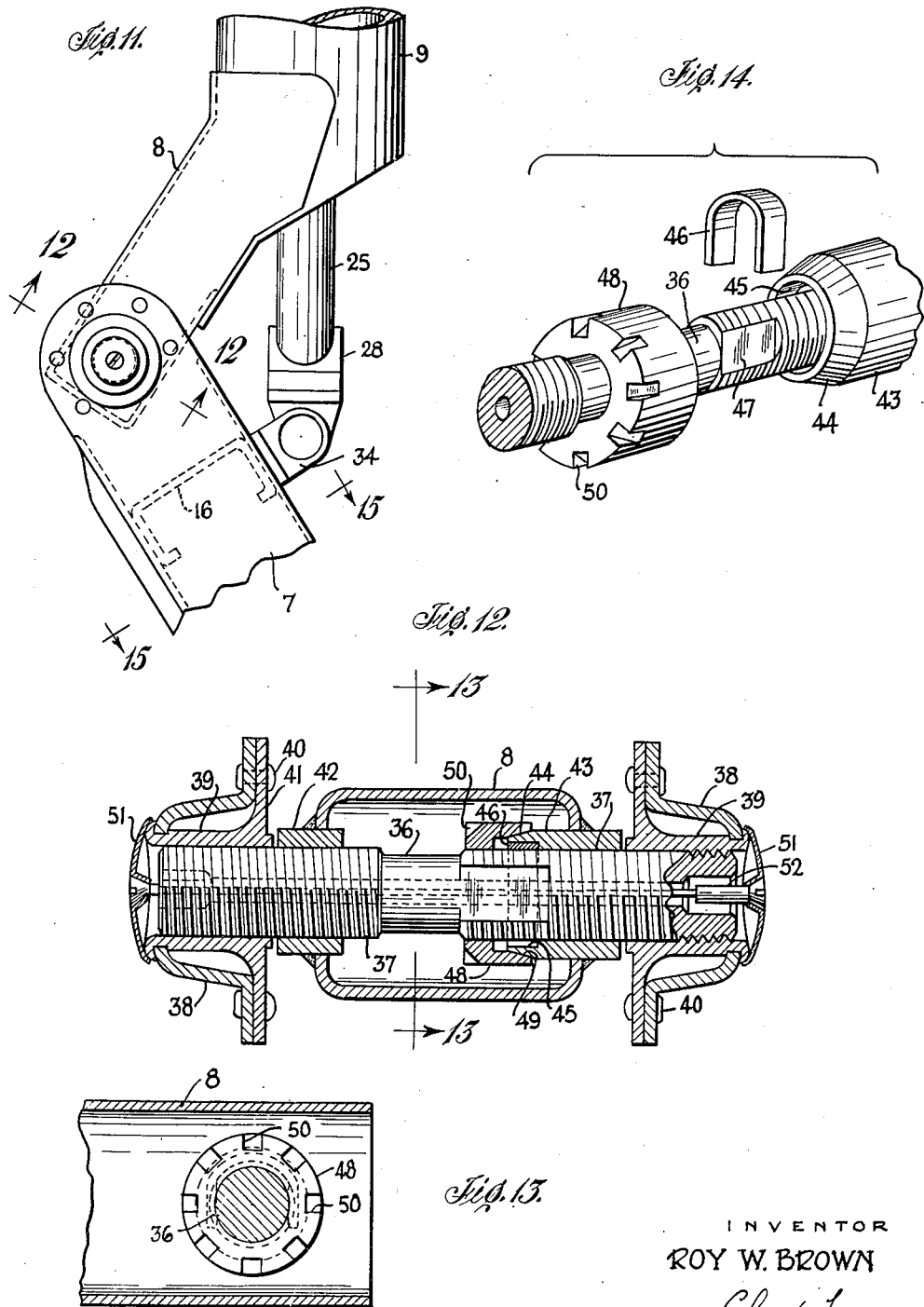

Jan. 9, 1951 R. W. BROWN 2,537,634
PIVOTAL MOUNTING FOR AIRCRAFT WHEELS
Filed Sept. 13, 1946 7 Sheets-Sheet 7

INVENTOR
ROY W. BROWN

BY
Ely & Frye
ATTORNEYS

Patented Jan. 9, 1951

2,537,634

UNITED STATES PATENT OFFICE 2,537,634

PIVOTAL MOUNTING FOR AIRCRAFT WHEELS

Roy W. Brown, Akron, Ohio, assignor to The Firestone Tire & Rubber Company, Akron, Ohio, a corporation of Ohio Application September 13, 1946, Serial No. 696,884

3 Claims. (Cl. 244—103)

This invention relates to aircraft undercarriages and has for its general object the provision of an inexpensive aircraft undercarriage which is light in weight and adaptable for use with different sized and weight planes.

Another object of the invention is to provide an aircraft undercarriage which has desirable taxiing and shock absorbing characteristics.

Another object of the invention is to provide an aircraft undercarriage which has a large safety factor and which permits a large wheel movement under load.

A further object of the invention is to provide a novel shock absorption unit utilizing a rubber sleeve support member.

Yet another object of the invention is to provide a reenforced rubber sleeve as a load carrying member.

Another object of the invention is to provide an enclosed rubber sleeve support member which can be combined with a compressed fluid for support action.

A further object of the invention is to provide a strong suspension beam in an aircraft undercarriage, which beam is formed from identical stamped metal members.

Further objects of the invention are to provide a support arm for an aircraft wheel, which arm is mounted for limited universal movement; to provide a support arm bracket that is substantially rigid in the direction of normal load application but slightly flexible in a direction normal thereto; to provide a pivotal mounting for an aircraft wheel to permit it to follow turning forces applied thereto; to provide a novel type of friction material covered rubber thrust ring having a reenforcing ring therein; to provide a threaded bushing with a seat portion thereon to aid in forming a rigid mount on a suspension beam for an aircraft wheel shaft; and to provide a novel lock pin and securing means for retaining a shaft locked to a support arm.

The foregoing and other objects and advantages of the invention will be made apparent as the specification proceeds.

Attention now is directed to the accompanying drawings, wherein:

Fig. 4 is an enlarged elevation, partly in section, of the undercarriage unit alone;

Fig. 5 is a fragmentary section of the absorption unit of the invention before it is completely assembled;

Fig. 6 is a side elevation of the undercarriage unit of Fig. 4, with the extreme positions of the wheel being indicated in dotted lines;

Figs. 7, 8 and 9 are sections, similar to Fig. 5, of the unit under no or normal load, part load, and greater load, respectively;

Fig. 10 is an enlarged vertical section on line 10—10 of Fig. 5;

Fig. 11 is a fragmentary enlarged side elevation of the connection of the support tube and the suspension beam of the invention;

Fig. 12 is a longitudinal section on line 12—12 of Fig. 11;

Fig. 13 is a transverse section on line 13—13 of Fig. 12;

Fig. 14 is a partially exploded view of the mounting pin assembly for the suspension beam;

Fig. 15 is a section on line 15—15 of Fig. 11;

Fig. 16 is a fragmentary section of the suspension arm and wheel mounting shaft on line 16—16 of Fig. 4;

Fig. 17 is a fragmentary longitudinal section of a modified type of a mounting arm for the suspension beam;

Fig. 18 is a transverse section on line 18—18 of Fig. 17;

Figure 1:
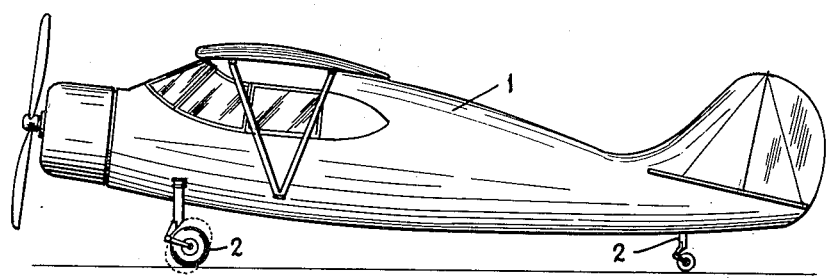
Fig. 1 is a side elevation of an airplane having an undercarriage embodying the principles of the invention.
Figure 2:
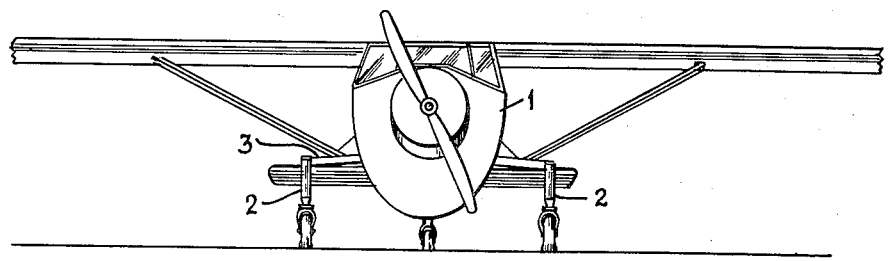
Fig. 2 is a front elevation of the airplane of Fig. 1.

Referring in detail to the construction shown in the drawings, an airplane 1 of conventional design is provided with a plurality of undercarriage units, indicated generally by the numeral 2, which support the airplane and absorb the landing impacts thereof. In Fig. 2, the units 2 at the front of the plane are shown as connecting to and being supported by cantilever arms 3 which are suitably secured to the airplane, while the tail undercarriage unit is directly secured to the fuselage of the plane.

Figure 3:
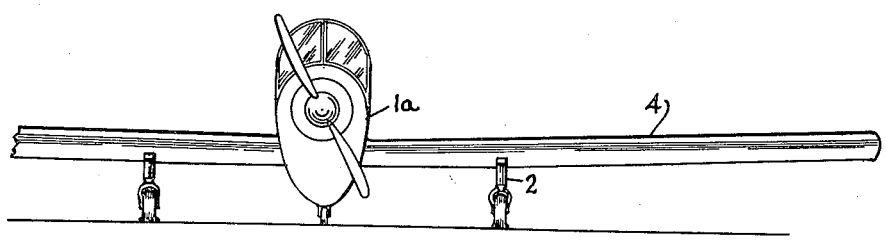
Fig. 3 is an elevation of an airplane showing a different type assembly of the undercarriage of the invention.

Fig. 3 shows a different mounting for the units 2 which are in this instance secured to the wings 4 of an airplane 1ª but it will be realized that any desired mounting structure may be used with the undercarriage units of the invention.

Aircraft undercarriages obviously are subjected to severe impacts on landings and in general must be sturdily constructed. To this end, the units 2 each support a wheel 5, carrying a pneumatic tire 6, by a substantially U-shaped load carrying, or suspension beam 7 that is pivotally carried by a hollow rectangular bracket 8 that is welded or otherwise secured to and eccentrically extends from the lower end of a vertically positioned support tube 9. The wheels 5 are mounted on shafts 10 that have threaded portions 11 formed thereon at their ends.

A feature of the invention is that a substantially rigid beam construction is provided for the free ends of the suspension beam 7 and this result is achieved partly by tapped lock or bushing members 12 and 12ª which engage with the threads 11 on the ends of the shaft 10. The members 12 and 12ª have at least a pair of parallel, straight edge surfaces which seat between and are locked in position by pairs of upstanding, or inwardly directed flanges 13 formed on plates 14 suitably secured to the lower portions of the suspension beam 7. Then cap screws 15 extend through the end sections of the beam 7 and engage with tapped end holes in the shaft 10 to draw the shaft tightly between the ends of the beam and form a strong shock-resistant, load-carrying member therefrom. Each arm of the suspension beam 7 is formed, preferably, from a stamped metal part and ordinarily the beam is formed from two stamped members that are welded together in back to back relation, as indicated in Fig. 4. A reenforcing plate 16 may be welded to the inturned flanges of the beam sections to reenforce them while inwardly turned lugs 17 of any suitable length may be welded together at their edges to form a closed hollow section in the beam arm. A reenforcing channel 18 may be formed in the arms of the beam 7 for further strengthening the arm so that it can be made from light gauge material.

A prime feature of the invention is that the shock, or impact, absorption unit of the invention utilizes both a rubber distortion and air compression action for absorption of load. An elongated rubber sleeve 19, which is relatively thick walled and which is made from relatively stiff, high strength rubber, is received in the tube 9 for telescoping movement therein. The sleeve 19 is made of a plurality of annular sections 20 having concave outer surfaces and convex inner surfaces, as shown in Fig. 5. Rings 21, which are T-shaped in radial section, are positioned between and integrally bonded to the rubber sleeves at the radially inner legs of the rings. The rings 21 are metallic and suitably processed so as to have good adhesion with the rubber sleeve and the rings seem to reenforce the sleeves against buckling when loaded. The rings 21 and rubber sections 20 are assembled in desired form and then are integrally bonded together by vulcanization. The top or radially outer parts of the rings 21 are flush with or preferably extend slightly radially beyond the periphery of the sleeve 19 and friction material covers 22 are shown as being secured to these rings. This friction material 22 comprises fabric that is impregnated with a thixotropic lubricating composition which gives the material the unusual characteristic of greater kinetic coefficient of friction than static coefficient of friction. One example of such lubricant composition is made of castor oil, a wax compatible with the oil, and an aluminum soap uniformly dispersed in the composition. Graphite also may be present in the composition.

The upper end of the support tube 9 is closed by a cap 23 that is suitably secured thereto while a bottom cap 24 is secured to the lower end of the sleeve 19 in any suitable manner, as by vulcanization. A connector tube 25 is secured, as by a weld, to the cap 24 while a stop collar 26 is fixed in the lower end of the tube 9 to limit downward motion of the rubber sleeve 19 after the sleeve is telescoped into engagement with the support tube and the collar 26 is secured in position. In setting up the absorption unit, it normally is helpful to make the rubber sleeve of such size that it must be compressed or stressed in order to get it into position in a support tube. A rubber washer 27 may be carried by the lower surface of the cap 25 to cushion it when it contacts the collar 26.

It also is very helpful in adapting the undercarriage units of the invention to carry any of a variety of loads, to use air pressure in the tube 9 to aid in load support. Thus the tube 9 must be air tight and a fitting 90 is positioned in the tube wall for connection to suitable air pressure supply means. For example, by varying the pressure in the tube from a low of 300 pounds per square inch to a high of 1200 pounds per square inch the load supported by the absorption unit can be widely varied.

The connector tube 25 is welded, preferably, at its lower end to a relatively long, thin bracket 28 which is positioned in, or parallel to the plane of rotation of the wheel 5.

The bracket 28 has a reduced thickness section 29 extending longitudinally thereof, as shown in Fig. 10, so that the bracket is strong in its general direction of load application but is slightly flexible in a direction transverse thereto. The foot or lower end 28ª of the bracket 28 has a hole 30 therein which has a shaft or pin 31, carrying bearings 32 and 33, extending therethrough. The pin 31 may be tubular to reduce its weight and it is secured at its ends in aligned housings 34 that are secured to the suspension beam 7 by bolts 35. The bracket 28 may be welded to the bearing 32 which is rotatably carried by the bearing 33.

The support end of the suspension beam 7 is pivotally secured to the bracket 8 by a pin 36 which has threaded sections 37 formed at the ends thereof with the threads on such sections 37 extending in the same direction. The beam 7 has bosses 38 formed on its opposite sides at its ends and tapped bearings 39 are positioned in the bosses 38, being secured in place by flaring or peening their outer ends over the adjacent beam sections and by conventional devices, such as rivets 40, that extend through the beam 7 and flanges 41 of the bearings 39. The bracket 8 is provided with bearing 42 and 43 that are suitably secured thereto and have tapped bores through which the pin 36 extends and engages by the threaded sections 37. The bearing 43 has a tapered or conical end portion 44 which has a counterbore 45 formed at such end as shown in Fig. 14. Then a U shaped lock pin 46 is provided to engage with parallel flattened sections 47 formed on opposite sides of the pin 36. Another feature of the invention is that the pin 46 is retained in place and the bracket 8 is secured to the pin 36 by a lock nut 48 that has a reamed bore end 49 which is adapted to engage with the conical end 44 and, as the nut 48 is engaged with the threads 37 on pin 36, the end of the nut is forced up on the end of the bearing 43 to press the end 44 down to secure the lock pin 45 in position and lock the pin 36 to the bracket 8. Axially extending slots 50, which are circumferentially spaced, are formed in the outer corner of the nut 48 for engagement with lugs on a tool for loosening or tightening the nut 48. The pin 36 is positioned by threading it through the left hand bearings 39 and 42 into the beam 8 where the lock nut 48 is held and the pin 36 then is threaded through such nut 48 and through the other bearings 39 and 43. As shown, the pin 36 may be tubular and have end covers 51 secured thereto by a bolt 52 that extends through the pin.

In a modification of the suspension beam shown in Figs. 17 and 18, the suspension beam arms 60 are provided with integral end flanges 61 that extend inwardly therefrom for engagement with the ends of the lock members which are used to mount the wheel support shafts. Thus the use of the separate plates, as the plates 14 in Fig. 4 is avoided. A reenforcing rib 62 may be formed on the arms 60.

Figure 19:
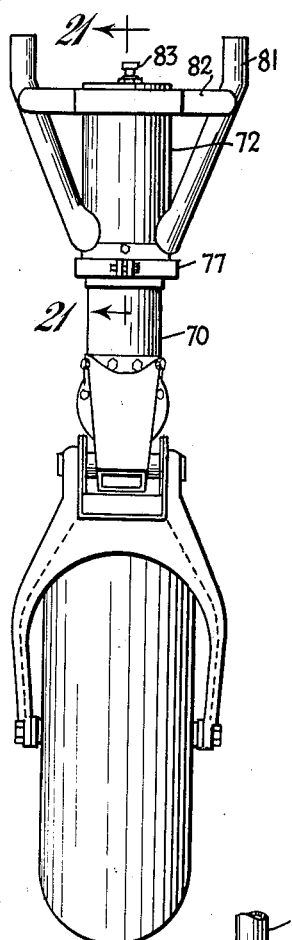
Fig. 19 is an elevation of a modified type of undercarriage unit of the invention.
Figure 20:
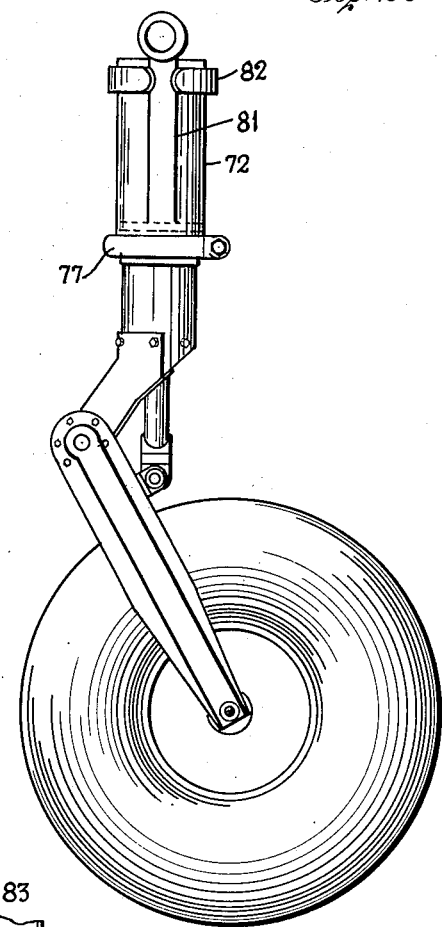
Fig. 20 is a side elevation of the undercarriage unit of Fig. 19.
Figure 21:
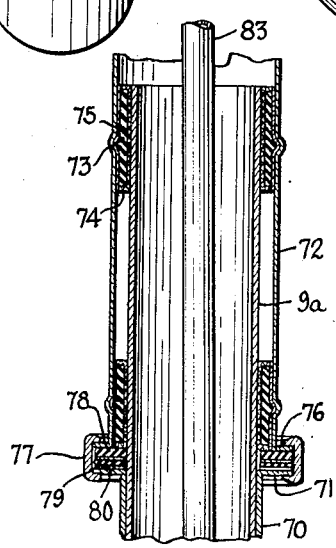
Fig. 21 is an enlarged vertical section on line 21—21 of Fig. 19.

Another embodiment of the invention wherein the undercarriage is free to pivot as a castor, is shown in Figs. 19 through 21. In these figures, the support tube 9ª is similar to the tube 9 and carries the same wheel and load support means as described hereinbefore. The tube 9ª has a short tube 70, having a flange 71 formed at its upper end, suitably secured to it adjacent its upper end while a housing or tube 72 is positioned in spaced encompassing relation to the tube. Suitable devices, such as rubber sleeves 73 having friction material covers 74 and metal backing plates 75 are positioned between the tubes 9ª and 72 to retain them in aligned association and to prevent too free relative movement therebetween. A load support flange 76 is formed at the lower end of the tube 72 and a split lock ring or collar 77 is positioned over the flanges 71 and 76 to secure them together and to transmit tensional load therebetween. An annular flat rubber thrust collar 78 is placed between the flanges 71 and 76 and it may have a flat metal thrust bearing 79 embedded therein. As another feature of the invention, a cover of friction material 80 may be provided on the lower surface of the bearing 78 to aid in damping tensional movement of the suspension unit. A pair of diametrically spaced mounting arms 81 are secured to the tube 72 and extend upwardly and outwardly therefrom and they have reenforcing members 82 secured therebetween, which arms 81 may be engaged in any desired manner with the aircraft on which the undercarriage is to be mounted. If desired, a tube 83 may be positioned in the tube 72 on the axis of such tube to connect to the rubber sleeve (not shown) in the tube 9ª for controlling the air pressure therein.

From the foregoing, it will be seen that a sturdy undercarriage unit is provided that can be used on any of a number of airplanes dependent upon the initial load conditions of the load absorption unit. The appreciably greater movement of the pneumatic tire and wheel than that of the load absorbing unit aids in giving desired properties to the support unit.

It will be realized that the load absorption unit and rubber sleeve of the invention may be used in any desired load condition for resilient support and that the other features of the invention, such as the construction of the means connecting the ends of the beam 7 and mounting it on the bracket 8 are of general application and can be used in other manners not disclosed herein.

While in accordance with the patent statutes, I have shown and described one embodiment of my invention, it will be understood that the invention is not limited thereto or thereby but is defined by the appended claims.

What is claimed is:

1. In an aircraft undercarriage, a support tube for supporting an aircraft wheel, a castor spindle for telescopically receiving said support tube and for securing same on an aircraft, rubber sleeve means having a friction material cover positioned between the telescoped portions of said support tube and said castor spindle for retaining them in alignment, a thrust collar secured to the outer periphery of said support tube at a point remote from the upper end thereof, said castor spindle having an annular support flange formed on its periphery at its lower end, a thrust bearing positioned on the upper surface of said thrust collar, and means securing the annular support flange of said caster spindle to said thrust collar with said thrust bearing therebetween for transmittal of load therebetween and so as to permit relative rotational movement, said means comprising a split collar with shoulders engaging the upper surface of said flange and the lower surface of said thrust collar.

2. In an aircraft undercarriage, a support tube for supporting an aircraft wheel, a castor spindle for telescopically receiving said support tube and for securing same on an aircraft, sleeve means positioned between the telescoped portions of said support tube and said castor spindle for retaining them in alignment, a thrust collar secured to the outer periphery of said support tube, said castor spindle having an annular support flange on its periphery at its lower end, a thrust bearing positioned on the upper surface of said thrust collar, and means securing the support flange of said castor spindle to said thrust collar with said thrust bearing therebetween for transmittal of load therebetween and so as to permit relative rotational movement, said means comprising a split collar with shoulders engaging the upper surface of said flange and the lower surface of said thrust collar.

3. In an aircraft undercarriage, a support tube for supporting an aircraft wheel, a castor spindle for telescopically receiving said support tube and for securing same on an aircraft, rubber sleeve means having a friction material cover positioned between the telescoped portions of said support tube and said castor spindle for retaining them in alignment, said friction material including fabric impregnated with a thixotropic lubricating composition which is adapted to impart a greater kinetic than static coefficient of friction, a thrust collar secured to the outer periphery of said support tube at a point remote from the upper end thereof, said castor spindle having an annular support flange formed on its periphery at its lower end, a thrust bearing positioned on the upper surface of said thrust collar, and means securing the annular support flange of said castor spindle to said thrust collar with said thrust bearing therebetween for transmittal of load therebetween and so as to permit relative rotational movement, said means comprising a split collar with shoulders engaging upper surface of said flange and lower surface of said thrust collar.

ROY W. BROWN.

(References on following page)

REFERENCES CITED

The following references are of record in the file of this patent:

UNITED STATES PATENTS

| Number | Name | Date |
|---|---|---|
| 1,698,372 | McElroy | Jan. 8, 1929 |
| 1,810,054 | Miller | June 16, 1931 |
| 2,189,232 | Snell | Feb. 6, 1940 |
| 2,213,810 | Faure-Roux | Sept. 3, 1940 |
| 2,251,239 | Dowty | July 29, 1941 |
| 2,348,493 | Parker | May 9, 1944 |
| 2,394,825 | Trader | Feb. 12, 1946 |

FOREIGN PATENTS

| Number | Country | Date |
|---|---|---|
| 421,223 | Great Britain | Dec. 17, 1934 |